Oct. 31, 1961 E. A. SCHOTT 3,006,577
CAR SUPPORT FOR NON-RIGID AIRSHIPS
Filed Aug. 6, 1959 3 Sheets-Sheet 1
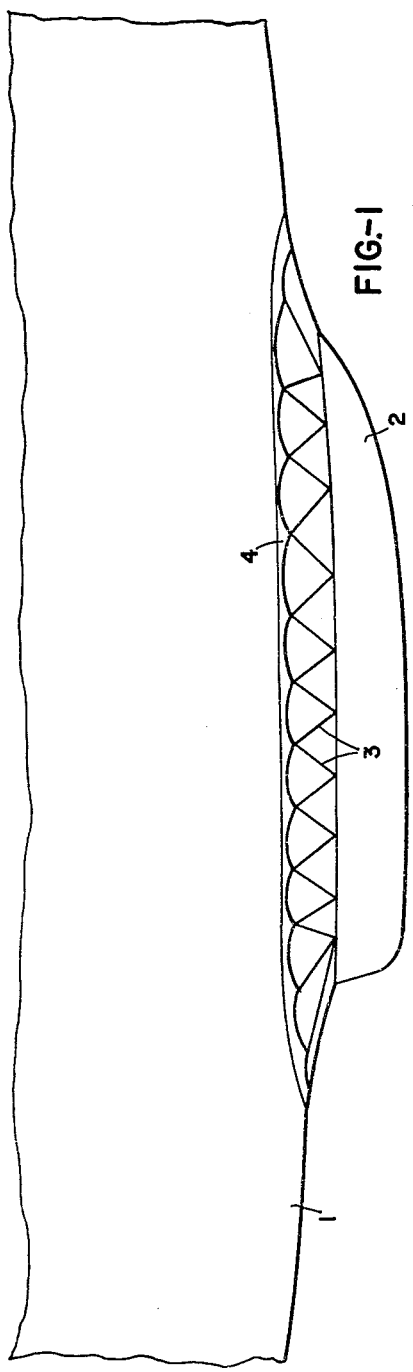
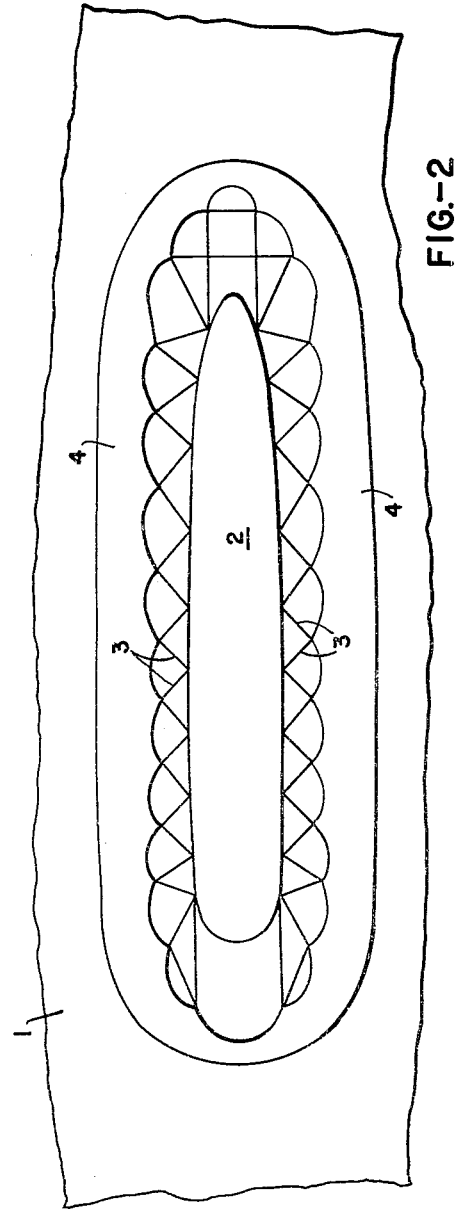
INVENTOR.
EUGENE A. SCHOTT
BY
ATTORNEY

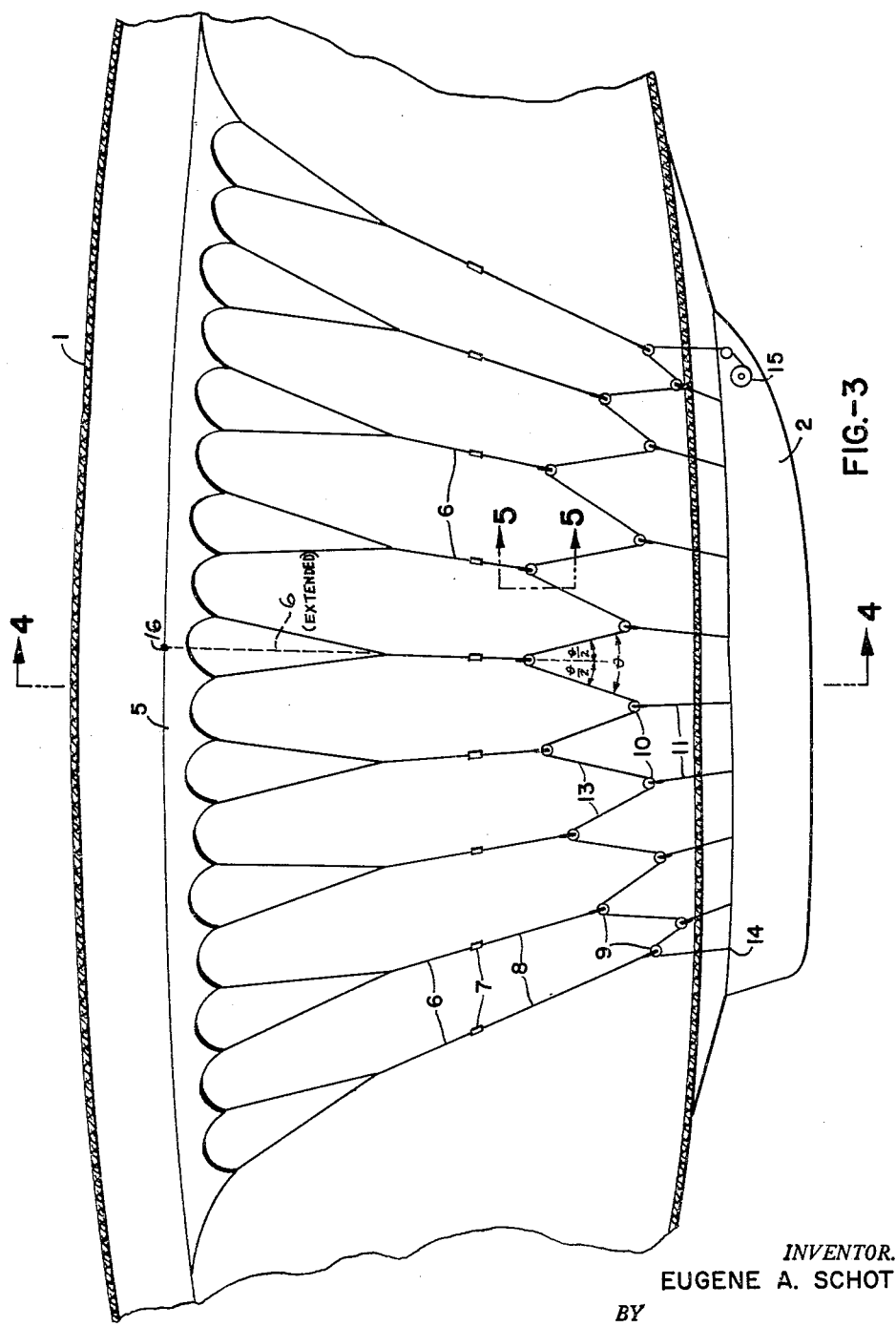

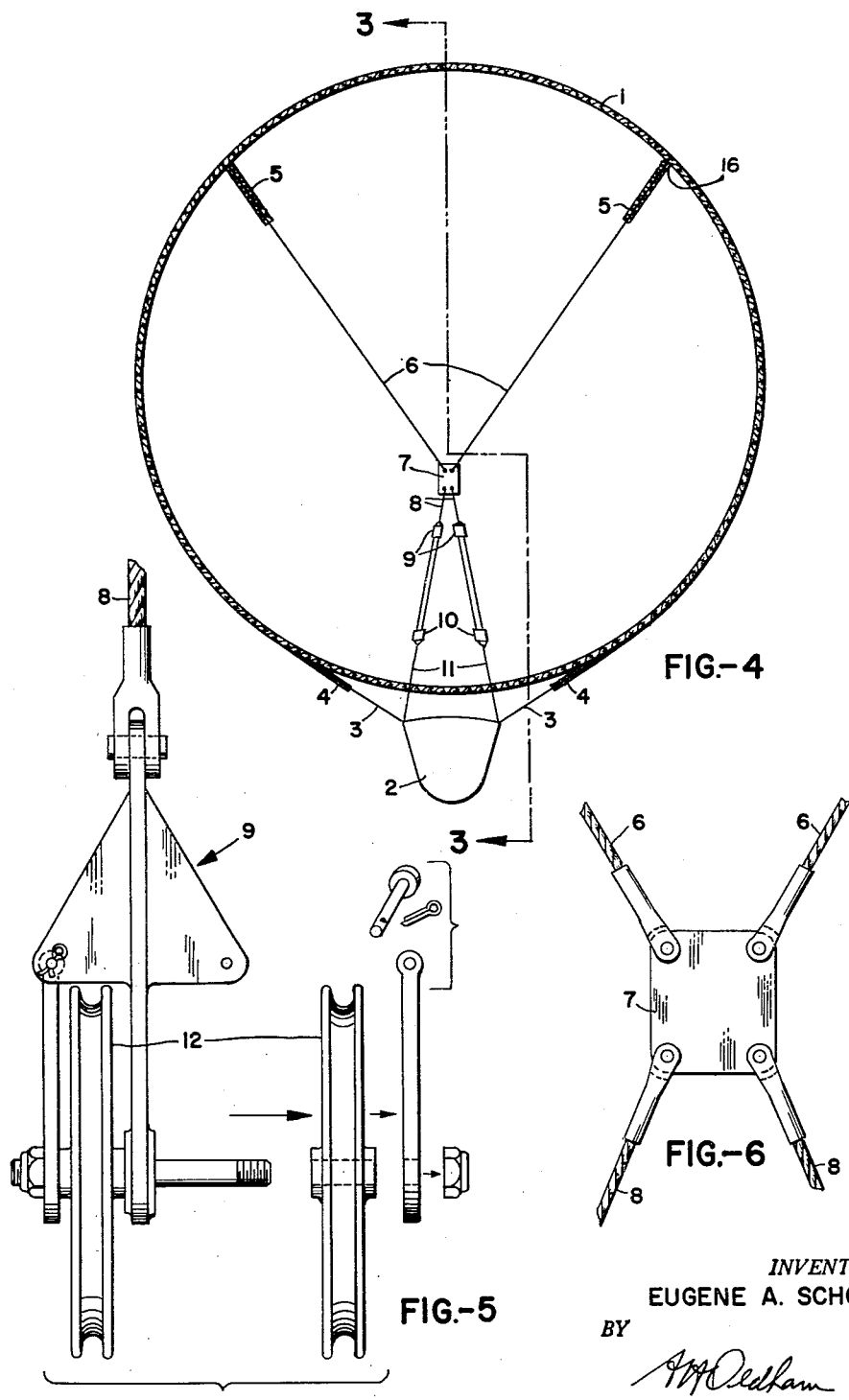

United States Patent Office 3,006,577
Patented Oct. 31, 1961

3,006,577
CAR SUPPORT FOR NON-RIGID AIRSHIPS
Eugene A. Schott, Akron, Ohio, assignor to Goodyear Aircraft Corporation, Akron, Ohio, a corporation of Delaware
Filed Aug. 6, 1959, Ser. No. 832,102
6 Claims. (Cl. 244—30)

This invention relates to the internal suspension system to be used in combination with any suitable external supporting arrangement for suspending a control car or other similar type of structure on the underside of the gas bag of a non-rigid airship.

Heretofore, it has been the standard practice to secure the control car to an airship envelope by a plurality of sets of cables. One set of cables extends between the control car and the outside of the under portion of the envelope. A second set of cables extend between catenaries in the inside of the envelope and the control car, each cable being adjustable as to length by means of a turnbuckle. In order to give the optimum shape to the envelope, the load of the control car must be properly distributed between the several sets of cables, and in the past this has necessitated very considerable adjustment of individual turnbuckles keeping in mind the advisability of substantially uniform loading of the catenary curtains. Moreover, as the envelope stretches and distorts in use, frequent and annoying readjustment of the turnbuckles has been necessary to reduce excessively high tensions in the end suspenders that resulted therefrom.

It is the general object of the invention to avoid and overcome the foregoing and other difficulties of the prior art by the provision of improved, relatively simple, easily applied and adjusted means for securing a car or other similar type of structure on the underside of a non-rigid airship, and characterized by ease and rapidity of manual adjustment and features of inherently correct longitudinal load distribution in spite of envelope fabric stretch and/or a change of shape of the envelope.

Another object of the invention is to provide the combination in the support for a control car or other similar type of structure in a non-rigid airship of means whereby the relative proportion of weight carried by the several sets of support means or cables, hereinafter called the inside set and the outside set, can be quickly and simply varied.

The foregoing objects of the invention, and other objects which will become apparent as the description proceeds, are achieved by providing in combination in an airship, an envelope adapted to receive lifting gas, a car or other similar type of structure adapted to be secured to the underside of the envelope, an outside set of support means extending between the car and the outside of the underside of the envelope in a direction substantially tangential to the envelope, an inside set of support means, said last-named means including a pair of longitudinally extending laterally spaced catenary curtains on the inside of the upper portion of the envelope, longitudinally spaced cables extending downwardly from the curtains, each terminating with a pulley attached thereto, longitudinally spaced cables extending upward from the car, each terminating with a pulley attached thereto within the envelope and spaced longitudinally between but lower than the first mentioned pulleys, an anchor cable or cables on each side of the airship attached to the car at one end and extending over every catenary pulley and under every car pulley within the envelope and extending through a sealed opening of the envelope, each cable terminating on a drum or reel which not only secures the cable or cables, but provides, by means of a winch or equivalent device, a method for actuating the reel and thereby changing the effective length of said cable or cables and consequently establishing the proportionate share of the car weight which is carried by the inside set of support means in relation to that carried by the outside set of support means.

For a better understanding of the invention, reference should be had to the drawings wherein:

FIG. 1 is a fragmentary side elevation of a control car and the underside of a non-rigid envelope illustrating external means securing the car to the envelope;

FIG. 2 is a bottom plan view of FIG. 1;

FIG. 3 is a fragmentary longitudinal cross-sectional view taken on line 3—3 of FIG. 4 of a non-rigid airship illustrating the internal support means for the control car on the envelope;

FIG. 4 is a diagrammatic cross-sectional view of the airship and taken on line 4—4 of FIG. 3;

FIG. 5 is a cross-sectional view of a typical pulley arrangement taken on line 5—5 of FIG. 3; and FIG. 6 is an enlarged view of the cable tie plate present in FIG. 4.

In the drawings, the numeral 1 indicates generally the fabric envelope of a non-rigid airship and secured to the underside of the envelope is a control car 2. The car is secured in position both by outside support means and by inside support means so that the center of gravity of the car is vertically below the center of buoyancy of the envelope in the normal riding attitude of the envelope. The outside support means are shown in FIGS. 1 and 2 and comprise cables 3 connected between the car 2 and a catenary curtain 4 of oval contour on the underside of the envelope. The cables 3 at the sides of the car 2 extend in a curved plane substantially tangent to the envelope.

Coming now to the inside support, these include catenary curtains 5 secured to the inside of the envelope in laterally spaced, longitudinally extending direction, as best seen in FIGS. 3 and 4, from which extend downwardly and inwardly directed upper suspenders 6, at longitudinally spaced points. Each suspender 6 in its upper reaches may be split to connect at two points to the curtain 5. Each of the laterally aligned suspenders 6 terminates in a connector plate 7 (see FIG. 4) and a pair of intermediate suspenders 8 extend downwardly and laterally outward from the plate 7 terminating at their lower ends in a pulley 9 within the envelope, usually having a pair of sheaves 12 therein as seen in FIG. 5.

Secured to the sides of the control car 2 by means of the short cables 11 are a plurality of pulleys 10 also within the envelope longitudinally spaced between the pulleys 9. The cables 11 may be continuous and extend through sealed openings through the envelope, although it is preferred to make each cable 11 of two pieces joined to opposite ears of companion flanges secured to one another and the fabric of the envelope. As seen in FIG. 5, each pulley 10 usually has a pair of sheaves 12 therein. The pulleys 9 and 10 are of the same construction permitting the sheaves 12 to be indivdually removed from their respective supporting shafts, which facilitates threading a new cable thereover in the manner hereinafter described.

A pair of cables 13 are provided along each side of the car 2 and one end of each cable is passed through the envelope and fastened at 14 to the car and at its other end is passed through the envelope and is secured to a winch or drum 15. The reach of each cable 13 extends alternately over a pulley 9 and under a pulley 10 until all the pulleys are connected together in the manner illustrated in FIG. 3. To provide for sealing the cables 13 to the envelope where the cables pass therethrough, the cables may be coated and impregnated with a plastic composition to seal the spaces between the wires thereof and to provide a smooth exterior surface, and bushings of plastic material having a low coefficient of friction, such as of Teflon may be secured to the envelope for slidably engaging about the cables and sealing against escape of gas from the envelope.

With the described arrangement and by establishing the geometry so that the secant of half the included angle θ (as shown on FIG. 3) of the anchor cable at any upper pulley 9 is of such a value that the tension component, at right angles to the longitudinal axis of the envelope, of suspender 8 which supports it has the same relation to the corresponding component of tension in suspender 8 at any other pulley 9 as the squares of the respective envelope diameters have to each other. The diameter is always measured at the theoretical point of intersection of the extension of suspender 6 with the envelope itself, indicated by point 16 as a typical example. In the case of the car cable attachment points for cables 11 being equal and/or symmetrical about the center of gravity of the car weight the suspenders 8 will all coincide with radial lines having a common point of intersection located on a vertical line through the center of gravity of the suspended weight. This is the ideal configuration, primarily because it allows no eccentricity between the line of action of the resultant of the internal suspender loads and the c.g. of the suspended weight and lends itself to a straightforward solution.

In utilizing this invention in an existing airship wherein the car attachment points are previously established and are not equal and/or symmetrical about the c.g. of the suspended weight some slight compromise in the distribution of the load will result. However, this is not serious by virtue of the employment of a compensating feature, wherein the suspenders 8 are arranged so that the longitudinal summation of all the horizontal components of the tensions in all the suspenders 8 summate to zero. At the same time the spacing of the suspenders 6 must be such as to provide the most desirable longitudinal distribution of load into the envelope. Thus, the vertical component of the tension in the suspender nearest the maximum airship diameter will be maximum and that of each of the other suspenders will be of some lesser magnitude so that its vertical component of tension will have very nearly the same relative magnitude to the maximum as the cross sectional areas of the envelope have at the respective suspender locations.

By employing a pair of cables 13 along each side of the car 2 and using double sheave pulleys, a double safety factor is achieved. Also, any anchor cable 13 can be replaced one at a time in the event of wear without simultaneously releasing any of the other anchor cables.

When a pair of cables 13 are used along each side of the car they must each be wound on separate reels or drums. Of course, if otherwise feasible, the two cable drums can have a common actuating winch providing the necessary clutching is provided to permit independent drive actuation.

As previously mentioned the primary function of the continuous anchor cables and pulleys which support them is to establish and automatically maintain within acceptable tolerances the proper load distribution to the envelope regardless of envelope fabric stretch or other conditions which tend to change the envelope shape.

The additional purpose of the rapidly adjustable feature of the continuous anchor cables for the car 2 is that the load distribution of the car weight can be quickly changed to provide the proper distribution of load between the inside support cables 6—8—13 and 11, and the outside support cables 3. Usually the inside cables carry about 65% of the weight and the outside cables 35%. But the exact proportion can be changed rapidly by means of the winches 15 so as to keep the airship envelope approximately circular in cross-section to permit maximum lift and to avoid the envelope going into an inverted pear-shape. The outside or external cables 3 absorb horizontal forces on the car and these cables could be used either with or without pulleys, but in no case are the benefits of this invention contingent upon the type of external suspension system with which it is employed.

By the combination described, the weight of the control car can be properly distributed longitudinally and laterally over the envelope to establish the best shape thereof, and this distribution is automatically maintained within very close tolerances or limits even though there is some stretching and distortion in the fabric of the envelope as the airship ages or maneuvers. This is achieved by virtue of the fact that the tension of any internal suspender no longer has the sensitive relationship to its actual length. In other words, a suspender's effective length is not its actual length as it is in the prior art. Additionally, by adjustment of the winches 15 the proportionate weight of the control car carried by the inside and the outside support means can be readily varied as the fabric of the envelope stretches in use.

It may be noted generally that it is possible to incorporate the principles of the invention herein described into the external support means although the specific manner of achieving this may form the subject matter of a separate application.

In the following claims, whenever the word "car" appears, it is to be understood that it not only applies to the conventional type of car which has been associated with non-rigid airships in the past, but to any similar type of structure suitable as a load carrying device regardless of the type of load which it supports.

While a certain representative embodiment and details have been shown for the purpose of illustrating the invention, it will be apparent to those skilled in this art that various changes and modifications may be made therein without departing from the spirit or scope of the invention. For example, all sheaves are usually equipped with cable guards to preclude any cable getting out of its sheave groove under any and all conditions that might otherwise be associated with a possible (not probable) momentary relaxation of the tension in the cable which is supported by it.

What is claimed is:

1. In an airship, an envelope adapted to receive lifting gas, a car adapted to be secured to the underside of the envelope, an outside set of support means extending between the car and the outside of the underside of the envelope in a direction substantially tangent to the envelope, an inside set of support means, said last-named means including a pair of longitudinally extending, laterally spaced catenary curtains on the inside of the upper portion of the envelope, longitudinally spaced upper suspenders extending downwardly from the curtains, pulleys associated with the upper suspenders, pulleys and short lower suspenders on the car longitudinally between the pulleys associated with the upper suspenders, a pair of winches at one end of the car, an anchor cable on each side of the longitudinal vertical centerplane of the airship envelope secured at one end to the car and at its other end to a winch, each anchor cable extending over each pulley associated with an upper suspender and under every car pulley whereby changing the effective length of the anchor cables by the winches increases or decreases the proportionate share of the weight of the car carried by the inside set of support means in relation to that carried by the outside set of support means, and the secants of the half angles which are subtended by the continuous anchor cable at the upper suspender pulleys vary in such a way that the components of tension, at right angles to the longitudinal axis of the envelope, of each respective upper suspender vary substantially in accordance with the variation of the squares of the effective diameters of the envelope at the several respective locations of load transfer from the upper suspenders to the envelope.

2. In an airship, an envelope adapted to receive lifting gas, a car adapted to be secured to the underside of the envelope, an outside set of support means extending between the car and the outside of the underside of the envelope, an inside set of support means, said last-named means including a pair of longitudinally extending, laterally spaced catenary curtains along the top inside of each side of the envelope, longitudinally spaced upper suspenders extending downwardly from the curtains, each suspender having associated therewith a pulley within the envelope, pulleys secured within the envelope to the car between the pulleys attached to the upper suspenders, a pair of winches at one end of the car, an anchor cable on each side of the longitudinal vertical centerplane of the airship envelope secured at one end to the car and at its other end to a winch, each anchor cable extending over each pulley associated with an upper suspender and under every car pulley whereby changing the effective length of the anchor cables by the winches increases or decreases the proportionate share of the weight of the car carried by the inside set of support means in relation to that carried by the outside set of support means.

3. In an airship, an envelope adapted to receive lifting gas, a car adapted to be secured to the underside of the envelope, an outside set of support means extending between the car and the outside of the underside of the envelope, an inside set of support means extending between the upper inside of the envelope and the car, and at least one set of said support means including quickly adjustable means having pulleys alternately connected to the car and the envelope and a cable running over the pulleys and operable at the car to simultaneously adjust the effective length of the said one set of support means for rapidly changing the respective proportion of car weight carried by the outside set of support means and by the inside set of support means.

4. In combination, an airship car, an airship envelope, longitudinally extending, laterally spaced catenary curtains on the upper inside of the envelope, a plurality of longitudinally spaced pulleys within the envelope secured to the car, a plurality of longitudinally spaced pulleys within the envelope connected to the catenaries on the envelope, a cable fastened at both ends to the car and extending through the ends of the envelope and alternately around a pulley on the envelope and a pulley on the car between the ends of the cable so that all the pulleys are engaged by the cable, and means on the car for adjusting the effective length of the cable.

5. The combination in an airship of an envelope adapted to receive lifting gas, catenary curtains secured to the top of the inside of the envelope in transversely spaced longitudinally extending positions, suspenders extending downwardly from the curtains in longitudinally spaced positions to provide a plurality of pairs of laterally aligned upper suspenders, a tie plate connecting each pair of suspenders, a pair of downwardly and laterally extending intermediate suspenders on each tie plate, a dual sheave pulley on the lower end of each laterally extending intermediate suspender, an airship car, a plurality of dual sheave pulleys within the envelope secured along each side of the car at spaces between each downwardly and laterally extending intermediate suspender, a pair of continuous anchor cables along each side of the car and running through the envelope over the dual sheave pulleys attached to the lower ends of the laterally extending intermediate suspenders and running under the dual sheave pulleys attached to the car, means for fastening one end of each anchor cable to the car at one end of the car, and winch means at the other end of the car for each cable to permit a change in its effective length.

6. The combination in an airship of an envelope adapted to receive lifting gas, a control car positioned beneath the envelope, means for securing the control car to the envelope by applying a downward, inwardly directed succession of upper suspender loads to the inside catenary curtain in the upper envelope region on each side of its longitudinal vertical centerplane in such a way that the load per each longitudinal unit of length of each catenary curtain at its juncture with the envelope varies in accordance with the squares of the effective diameters of the envelope at the several respective and consecutive portions of the envelope, said means including a pair of longitudinally extending, laterally spaced catenary curtains on the inside of the upper portion of the envelope, longitudinally spaced upper suspenders extending downwardly from the curtains, pulleys associated with the upper suspenders, pulleys and short lower suspenders on the car between the pulleys associated with the upper suspenders, a pair of winches at one end of the car, a continuous anchor cable on each side of the longitudinal vertical centerplane of the airship envelope, secured at one end to the car and its other end to a winch, each anchor cable extending over each pulley associated with an upper suspender and under every car pulley wherein the secants of the half angles which are subtended by the continuous anchor cables at the upper suspender pulleys vary in such a way that the components of the tensions, at right angles to the longitudinal axis of the envelope, at the upper suspender pulley supports, vary substantially in accordance with the variation of the squares of the effective diameters of the envelope at the respective locations of load transfer from the upper suspenders to the catenary curtain.

References Cited in the file of this patent

UNITED STATES PATENTS

| 1,544,431 | Broyles | June 30, 1925 |

FOREIGN PATENTS

| 111,522 | Germany | June 15, 1900 |
| 242,934 | Great Britain | Feb. 11, 1926 |